(12) United States Patent
Jernigan, IV

(10) Patent No.: US 8,161,076 B1
(45) Date of Patent: Apr. 17, 2012

(54) GENERATION AND USE OF A DATA STRUCTURE FOR DISTRIBUTING RESPONSIBILITIES AMONG MULTIPLE RESOURCES IN A NETWORK STORAGE SYSTEM

(75) Inventor: Richard P. Jernigan, IV, Ambridge, PA (US)

(73) Assignee: NetApp, Inc., Sunnyvale, CA (US)

( * ) Notice: Subject to any disclaimer, the term of this patent is extended or adjusted under 35 U.S.C. 154(b) by 381 days.

(21) Appl. No.: 12/417,572

(22) Filed: Apr. 2, 2009

(51) Int. Cl.
  *G06F 17/30* (2006.01)
(52) U.S. Cl. ...................... 707/793; 711/114
(58) Field of Classification Search .............. None
  See application file for complete search history.

(56) References Cited

U.S. PATENT DOCUMENTS

| | | | | |
|---|---|---|---|---|
| 6,289,334 B1 * | 9/2001 | Reiner et al. | ........... | 707/999.201 |
| 6,526,478 B1 * | 2/2003 | Kirby | ........... | 711/114 |
| 6,829,678 B1 * | 12/2004 | Sawdon et al. | ........... | 711/114 |
| 7,133,964 B2 * | 11/2006 | Rodrigues et al. | ........... | 711/114 |
| 7,730,258 B1 * | 6/2010 | Smith et al. | ........... | 711/114 |
| 7,886,111 B2 * | 2/2011 | Klemm et al. | ........... | 711/114 |
| 7,975,102 B1 | 7/2011 | Hyer, Jr. et al. | | |
| 2005/0114594 A1 * | 5/2005 | Corbett et al. | ........... | 711/114 |
| 2005/0192932 A1 * | 9/2005 | Kazar et al. | ........... | 707/1 |
| 2006/0248273 A1 * | 11/2006 | Jernigan et al. | ........... | 711/114 |
| 2010/0281214 A1 * | 11/2010 | Jernigan, IV | ........... | 711/114 |

* cited by examiner

*Primary Examiner* — Cheryl Lewis
*Assistant Examiner* — Scott A Waldron
(74) *Attorney, Agent, or Firm* — Perkins Coie LLP

(57) ABSTRACT

The technique introduced here includes generating a data structure for use in determining how responsibilities for services should be distributed amongst a plurality of resources in a network storage system. The technique includes an iterative process of optimizing the data structure for a plurality of performance/quality metrics, such as evenness of storage consumption across the storage system or a designated subset thereof, number of "hot spots", degree of data scatter, and number of changes needed to reflect a change in storage system geometry. The data structure can be a striping table for striping logical containers of data across multiple storage resources, such as data volumes, or physical storage devices. The "responsibilities for services", can include responsibility for storing a stripe of a logical container of data or responsibility for storing a segment of parity data for a logical container of data.

22 Claims, 12 Drawing Sheets

| S0 | S1 | S2 | S3 | S4 | S5 | S6 | S7 | S8 | S9 | S10 | S11 | S12 | S13 | S14 | S15 |
|----|----|----|----|----|----|----|----|----|----|-----|-----|-----|-----|-----|-----|
| 0  | 1  | 2  | 3  | 0  | 1  | 2  | 3  | 0  | 1  | 2   | 3   | 0   | 1   | 2   | 3   |

*FIG. 5A*

|               | To Volume-0 | To Volume-1 | To Volume-2 | To Volume-3 |
|---------------|-------------|-------------|-------------|-------------|
| From Volume-0 | 0           | 4           | 0           | 0           |
| From Volume-1 | 0           | 0           | 4           | 0           |
| From Volume-2 | 0           | 0           | 0           | 4           |
| From Volume-3 | 4           | 0           | 0           | 0           |

*FIG. 5B*

| S0 | S1 | S2 | S3 | S4 | S5 | S6 | S7 | S8 | S9 | S10 | S11 | S12 | S13 | S14 | S15 |
|----|----|----|----|----|----|----|----|----|----|-----|-----|-----|-----|-----|-----|
| 2  | 1  | 3  | 2  | 3  | 1  | 0  | 1  | 2  | 1  | 0   | 3   | 0   | 2   | 0   | 3   |

*FIG. 6A*

|               | To Volume-0 | To Volume-1 | To Volume-2 | To Volume-3 |
|---------------|-------------|-------------|-------------|-------------|
| From Volume-0 | 0           | 1           | 1           | 2           |
| From Volume-1 | 2           | 0           | 1           | 1           |
| From Volume-2 | 1           | 2           | 0           | 1           |
| From Volume-3 | 1           | 1           | 2           | 0           |

*FIG. 6B*

| 4: | 0 | 1 | 2 | 3 | 0 | 1 | 2 | 3 | 0 | 1 | 2 | 3 | 0 | 1 | 2 | 3 | 0 | 1 | 2 | 3 |
|---|---|---|---|---|---|---|---|---|---|---|---|---|---|---|---|---|---|---|---|---|
| 5: | 0 | 1 | 2 | 3 | 0 | 1 | 2 | 3 | 0 | 1 | 2 | 3 | 0 | 1 | 2 | 3 | 0 | 1 | 2 | 3 |
| Δ: | - | - | - | - | X | X | X | X | X | X | X | X | X | X | X | X | X | X | X | X |

FIG. 7

| 4: | 2 | 1 | 3 | 2 | 3 | 1 | 0 | 1 | 2 | 1 | 0 | 3 | 0 | 2 | 0 | 3 | 2 | 3 | 0 | 2 |
|---|---|---|---|---|---|---|---|---|---|---|---|---|---|---|---|---|---|---|---|---|
| 5: | 4 | 1 | 3 | 2 | 3 | 1 | 0 | 1 | 2 | 4 | 0 | 3 | 0 | 2 | 4 | 3 | 2 | 4 | 0 | 2 |
| Δ: | X | - | - | - | - | - | - | - | - | X | - | - | - | - | X | - | - | X | - | - |

FIG. 8

GENERATION AND USE OF A DATA STRUCTURE FOR DISTRIBUTING RESPONSIBILITIES AMONG MULTIPLE RESOURCES IN A NETWORK STORAGE SYSTEM

FIELD OF THE INVENTION

At least one embodiment of the present invention pertains to network storage systems, and more particularly, to a technique for generating and using a data structure for distributing responsibilities among multiple resources in a network storage system.

BACKGROUND

A network storage controller is a processing system that is used to store and retrieve data on behalf of one or more hosts on a network. A storage server is a type of storage controller that operates on behalf of one or more clients on a network, to store and manage data in a set of mass storage devices, such as magnetic or optical storage-based disks or tapes. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp, Inc. of Sunnyvale, Calif.

A plurality of storage server nodes can be interconnected to provide a storage system environment configured to service many clients. Each storage server node can be configured to service one or more volumes, wherein each volume stores one or more logical containers of data (e.g., files, LUNs, etc.). Yet often a large number of data access requests issued by the clients are directed to a small number of such data containers serviced by a particular storage system of the environment. A solution to this problem is to distribute the volumes among all of the storage server nodes of the storage system environment. This, in turn, distributes the data access requests, along with the processing resources needed to service such requests, among all of the storage server nodes, thereby reducing the individual processing load on each node. However, a noted disadvantage arises when only a single data container, such as a file, is heavily accessed by clients of the storage system environment. As a result, the storage server node attempting to service the requests directed to that data container may exceed its processing resources and become overburdened, with a corresponding degradation of speed and performance.

One solution to this problem is to use a striped file system. A striped file system is a file system that includes multiple data volumes, where each file is distributed ("striped") across multiple volumes. For any given file, some amount of data for the file (the first "stripe", for example, the first 1 MB of data) is stored contiguously within one volume, then a different volume is chosen to store the next stripe of data, and yet another volume is responsible for the stripe after that, and so on.

A consumer of a file is made aware of this striping pattern, so that the appropriate volume can be consulted to perform read or write access against the desired stripe of the file. The striping pattern is often stored in a data structure called a "striping table". A striping table is a data- or load-allocation data structure, which stores the pattern for striping data for a particular logical container of data (e.g., a file) across a plurality of storage resources (e.g., volumes). A particular striping table is made of multiple cells, where each cell corresponds to a different stripe of the logical data container and includes an identifier of the volume (or other storage resource) that contains that stripe. The table is considered infinitely repeating, so that if the desired stripe is beyond the end of the table, the "owner" volume for that stripe is given by the requested stripe modulo the number of cells in the table. Note that a striped file system typically hides the striping from the ultimate client, however, by embedding the knowledge of the striping pattern within a module that receives client requests and forwards them to an appropriate volume.

A particular striping table is tied to the number of constituent volumes (or other resources) making up the storage for the striped file system. For example, a striping table for storing data in a file system consisting of four volumes may not be suitable for a file system in which files are striped across three, five, or some other number of volumes.

Further, the particular layout of a striping table can affect the performance of a storage system. There are various performance related criteria on which one can judge the strength of a particular striping pattern (as represented in a striping table), such that some layouts of striped data may be preferable to others. One problem often encountered when generating a striping table, however, is that some of these criteria are mutually antagonistic, such that designing a striping pattern that is strong in one criterion might impair its performance in another criterion.

Another problem is associated with changes in the file system that increase or decrease the number of volumes across which data is striped. Because the striping table is tied to the number of volumes, the striping table needs to be modified when the geometry of the file system is changed in this way. Depending on the striping algorithm employed, adding or deleting even a single volume can necessitate modifying a significant portion of the striping table, which correspondingly implies having to migrate a large portion of the stored data to different volumes. Such data migration can be time-consuming and undesirably consumes computing resources and communications bandwidth.

SUMMARY

The technique introduced here includes generating a data structure for use in determining how responsibilities for services should be distributed amongst a plurality of resources in a network storage system. The technique includes an iterative process of optimizing the data structure for a plurality of performance/quality metrics. The plurality of the metrics can measure, for example, the evenness of storage consumption across the storage system or a designated subset thereof, the number of "hot spots" (discussed below) in the storage system, the degree of data scatter in the storage system, and the number of changes needed to reflect a change in the geometry of the storage system. This technique therefore can be used to optimize the design of such data structure (e.g., a striping table) over essentially any number of different criteria, and can be used to reduce the number of changes required to the data layout in a storage system when the geometry of the storage system is changed (e.g., by adding or deleting volumes). The technique can be implemented in a network storage controller.

The data structure can be a striping table for use in striping logical containers of data (e.g., files or LUNs) across a plurality of storage resources, where each cell in the table corresponds to a different stripe and includes an identifier of the owner volume of that stripe. The resources can be, for example, data volumes, or physical storage devices in a redundant array of independent disks/devices (RAID) group. The "responsibilities for services", can include, for example, responsibility for storing a stripe of a logical container of data or responsibility for storing a segment of parity data for a logical container of data.

In certain embodiments, the iterative technique includes successively adding regions to the data structure until the number of regions equals the number of volumes in the storage system. After each instance of adding a region to the data structure, the following is done before another region is added: For each of the existing regions, cells in the region are successively replaced with an identifier of a new volume (i.e., a volume not yet represented in the data structure), and the table is scored for the plurality of metrics after each such instance of replacing a cell; then one cell in the region is selected for replacement, based on overall results of said scoring, and the cell is replaced with the identifier of the new volume. The iterative process includes repeating this scoring and selection, for each region of the data structure, and then further repeating this process for all regions each time a region is added to the data structure, while the number of regions is less than or equal to the number of volumes in the storage system.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 5A illustrates an example of a striping table that uses a round robin striping pattern;

FIG. 5B illustrates a table showing numbers of transitions between volumes in the striping table of FIG. 5A;

FIG. 6A illustrates an example of a striping table that uses a different striping pattern;

FIG. 6B illustrates a table showing numbers of transitions between volumes in the striping table of FIG. 6A;

FIG. 7 illustrates changes to a striping table resulting from the addition of a volume to a file system, when using a round robin striping pattern;

FIG. 8 illustrates changes to a striping table resulting from the addition of a volume to a file system, when using a different striping pattern;

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

This description describes a technique of data layout mainly in the context of striping file data in a distributed file system. Note, however, that this technique or a substantially similar technique is also suitable for use in a number of other types of systems and contexts. For example, another possible use is within a RAID subsystem, to choose which constituent of a RAID array should store parity data. By using this technique, one can increase RAID performance, reduce or eliminate latency resulting from sequential access (which is a very common workload) and still allow rapid expansion of the RAID array without rebuilding the majority of the RAID parity data.

Other applications for the technique introduced here can also be envisioned, potentially occurring wherever a collection of systems must distribute a shared responsibility granularly among themselves. Scheduling systems, queuing models and so forth are potential candidates for benefiting from the technique introduced here.

System Environment

Figure 1:
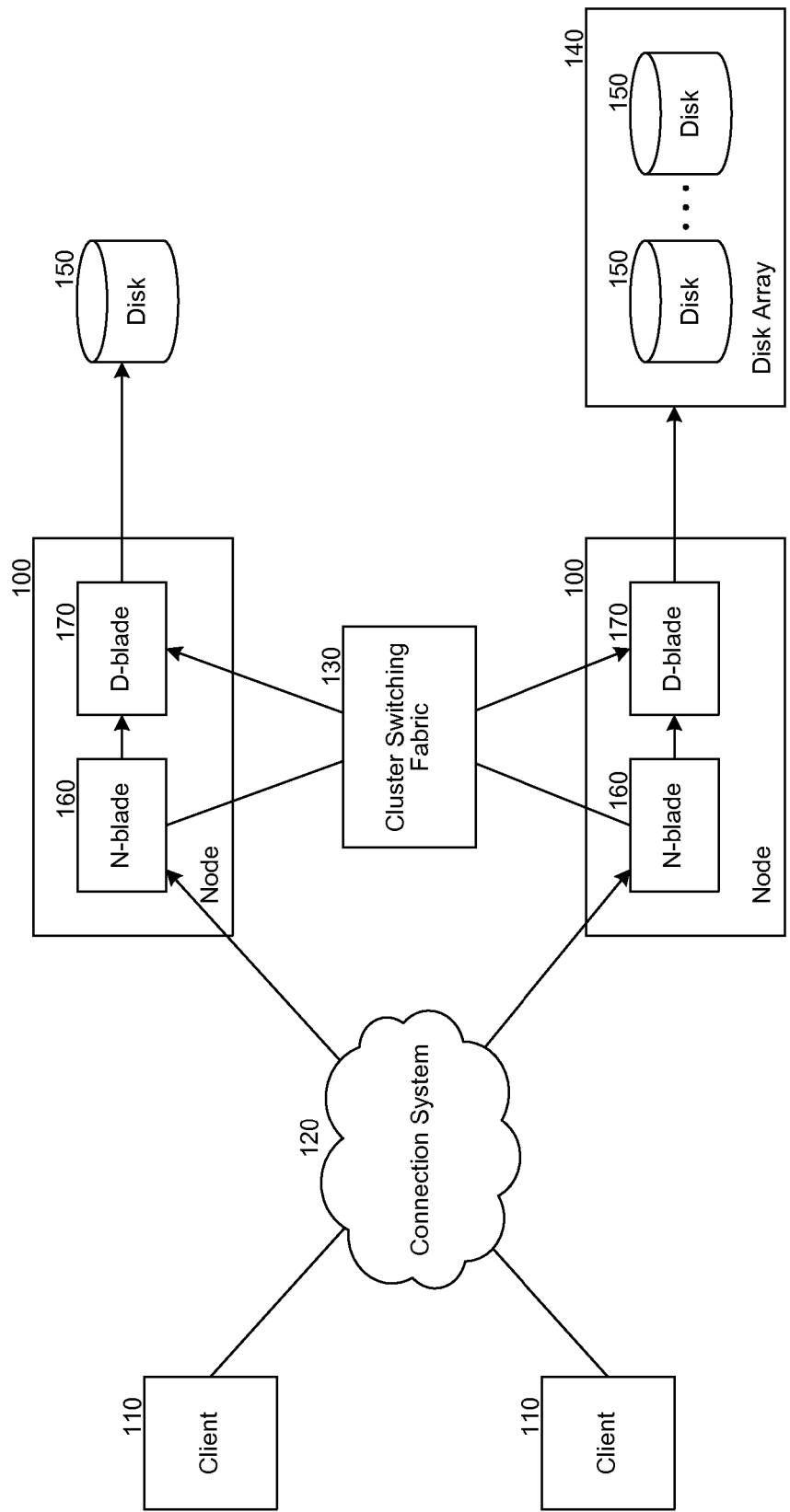
FIG. 1 is a diagram illustrating a plurality of nodes interconnected as a cluster in a clustered computing environment.

Before discussing the technique introduced here, it is useful to consider a computing environment in which the technique can be implemented. FIG. 1 shows such a computing environment, which includes a plurality of nodes 100 interconnected as a cluster of a clustered computing environment. The nodes 100 are configured to provide storage services relating to the organization of information on storage devices, such as a disk array 140. The nodes 100 include various functional components that cooperate to provide a distributed storage system architecture of the cluster. Further, each node 100 is organized to include a network element ("N-blade") 160 and a data element ("D-blade") 170. The N-blade 160 includes functionality that enables the node 100 to connect to clients 110 over a connection system 120, while each D-blade 170 connects to one or more storage devices, such as disks 150 of a disk array 140. Note that another embodiment, the storage devices could be devices other than disks, such as flash memory, tape storage, etc. The nodes 100 are interconnected by a cluster switching fabric 130 which, in the illustrated embodiment, can be embodied as a Gigabit Ethernet switch.

The N-blades 160 and D-blades 170 cooperate to provide a highly-scalable, distributed storage system architecture of a clustered computing environment implementing exemplary embodiments of the present invention. Note that while there is shown an equal number of N-blades and D-blades in FIG. 1, there may be differing numbers of N-blades and/or D-blades in accordance with various embodiments of the technique described here. For example, there need not be a one-to-one correspondence between the N-blades and D-blades. As such, the description of a node 100 comprising one N-blade and one D-blade should be understood to be illustrative only.

The clients 110 can be, for example, general-purpose computers configured to interact with the node 100 in accordance with a client/server model of information delivery. That is, each client 110 may request the services of the node 100 (e.g., to read or write data), and the node 100 may return the results of the services requested by the client 110, by exchanging packets over the connection system 120. The client 110 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
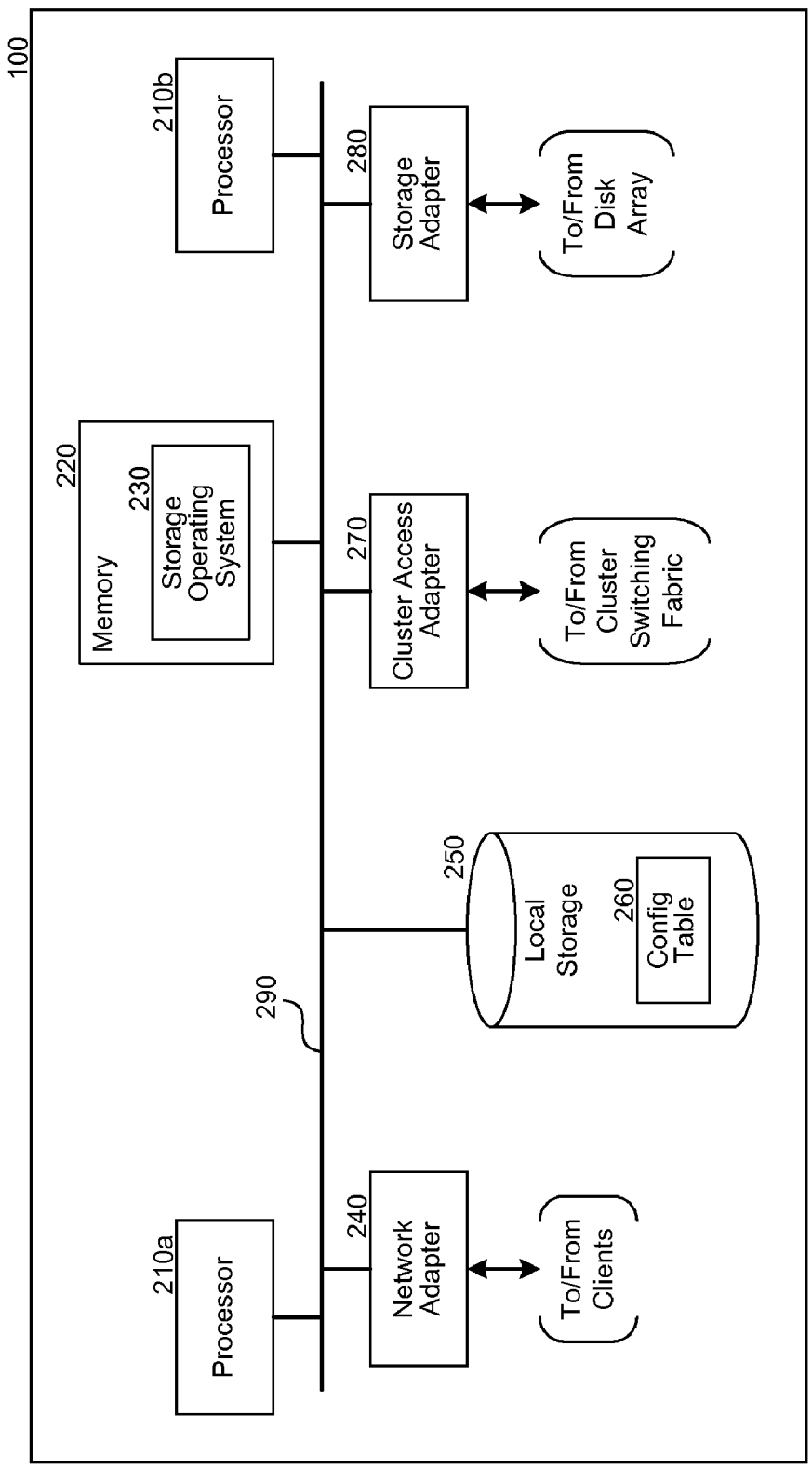
FIG. 2 is a diagram illustrating a node of the cluster in FIG. 1.

FIG. 2 is a diagram illustrating an example of a node 100 in greater detail. In an exemplary embodiment, the node 100 is a storage system that includes a plurality of processors 210a, 210b, a memory 220, a network adapter 240, a cluster access adapter 270, a storage adapter 280 and local storage 250, all interconnected by an interconnect 290. The local storage 250 includes one or more storage devices, such as disks, utilized by the node 100 to locally store configuration information (e.g., in configuration table 260) provided by one or more management processes that execute as user mode applications. The cluster access adapter 270 includes a plurality of ports adapted to couple the node 100 to other nodes 100 of the cluster. In the illustrated embodiment, Ethernet is used as the clustering protocol and interconnect media, although other types of protocols and interconnects may be utilized within the cluster architecture described herein. In alternative embodiments where the N-blades and D-blades are implemented on separate storage systems or computers, the cluster access adapter 270 is utilized by the N-blade 160 and/or D-blade 170 for communicating with other N-blades and/or D-blades of the cluster.

Each node 100 can be embodied as a dual processor storage system executing a storage operating system 230 that preferably implements a high-level module, such as a storage manager, to logically organize the information as a hierarchical structure of named directories, files and special types of files called virtual disks (hereinafter generally "blocks") on the disks. Note, however, that the node 100 can alternatively comprise a single processor or more than two processor system. Illustratively, one processor 210a can execute the functions of the N-blade 160 on the node 100 while the other processor 210b executes the functions of the D-blade 170.

The memory 220 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 230, portions of which is typically resident in memory and executed by the processing elements, functionally organizes the node 100 by, inter alia, invoking storage operations in support of the storage service provided by the node 100. It will be apparent to those skilled in the art that other processing and memory implementations, including various computer readable storage media, may be used for storing and executing program instructions pertaining to the technique introduced here.

The network adapter 240 includes a plurality of ports to couple the node 100 to one or more clients 110 over point-to-point links, wide area networks, virtual private networks implemented over a public network (Internet) or a shared local area network. The network adapter 240 thus can include the mechanical, electrical and signaling circuitry needed to connect the node 100 to the network of the connection system 120. Illustratively, the connection system 120 can be embodied as an Ethernet network or a Fibre Channel (FC) network. Each client 110 can communicate with the node 100 over the connection system 120 by exchanging discrete frames or packets of data according to pre-defined protocols, such as TCP/IP.

The storage adapter 280 cooperates with the storage operating system 230 executing on the node 100 to access information requested by the clients 110. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 150 of the disk array 140. The storage adapter 280 includes a plurality of ports having input/output (I/O) interface circuitry that couples to the disks 150 over an I/O interconnect arrangement, such as a conventional high-performance, Fibre Channel (FC) link topology.

Storage of information on each disk array 140 can be implemented as one or more storage volumes that include a collection of physical storage disks 150 cooperating to define an overall logical arrangement of volume block number (VBN) space on the volume(s). A "volume", as the term is used herein, is a logical container of data which is an abstraction of physical storage, combining one or more physical mass storage devices (e.g., disks) or parts thereof into a single logical storage object, and which is managed as a single administrative unit, such as a single file system. Each volume is generally, although not necessarily, associated with its own file system. A "file system", as the term is used herein, is a structured (e.g., hierarchical) set of stored logical containers of data, such as blocks, files, logical unit numbers (LUNs), directories and/or other data containers. Note, however that a "file system", as the term is used herein, does not necessarily store data in terms of "files" per se. For example, a file system can implement block based storage, where a "block" is defined herein as the smallest addressable unit of contiguous data used by a given file system to manipulate and transfer data, commonly (though not necessarily) 4 kbytes in size.

The disks within a volume/file system are typically organized as one or more RAID groups. Most RAID implementations, such as RAID-4, enhance the reliability/integrity of data storage through the redundant writing of data "stripes" across a given number of physical disks in the RAID group, and the appropriate storing of parity information with respect to the striped data. RAID-4 is an illustrative example of a RAID implementation, although other types and levels of RAID implementations can be used in accordance with the principles described herein. It should also be appreciated that RAID data "stripes" are different from the striping of across volumes, described further below.

The storage operating system 230 facilitates clients' access to data stored on the disks 150. In certain embodiments, the storage operating system 230 implements a write-anywhere file system that cooperates with one or more virtualization modules to "virtualize" the storage space provided by disks 150. In certain embodiments, a storage manager 360 (FIG. 3) logically organizes the information as a hierarchical structure of named directories and files on the disks 150. Each "on-disk" file may be implemented as set of disk blocks configured to store information, such as data, whereas the directory may be implemented as a specially formatted file in which names and links to other files and directories are stored. The virtualization module(s) allow the storage manager 360 to further logically organize information as a hierarchical structure of blocks on the disks that are exported as named logical unit numbers (LUNs).

In the illustrative embodiment, the storage operating system 230 is a version of the Data ONTAP® operating system available from NetApp®, Inc. of Sunnyvale, Calif. and the storage manager 360 implements the Write Anywhere File Layout (WAFL®) file system from NetApp®, Inc. However, other storage operating systems are capable of being enhanced for use in accordance with the principles described herein.

Figure 3:
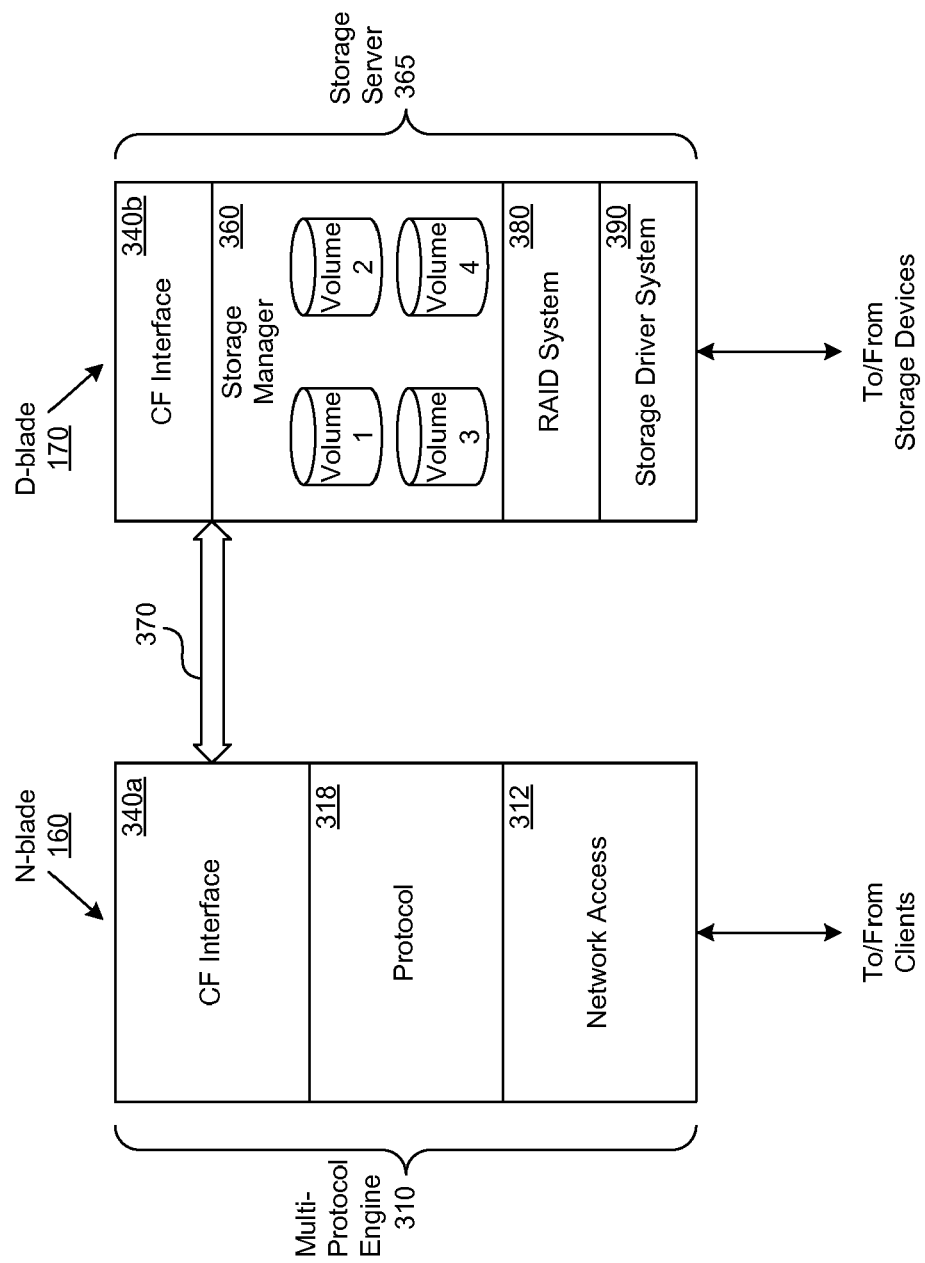
FIG. 3 is a diagram illustrating a storage operating system that may be used to implement a node.

FIG. 3 is a diagram illustrating an example of storage operating system 230 that can be used with the technique introduced here. In the illustrated embodiment the storage operating system 230 includes multiple functional layers organized to form an integrated network protocol stack or, more generally, a multi-protocol engine 310 that provides data paths for clients to access information stored on the node using block and file access protocols. The multiprotocol engine 310 also forms the N-blade 160 in combination with underlying processing hardware. The multi-protocol engine includes a network access layer 312 which includes one or more network drivers that implement one or more lower-level protocols to enable the processing system to communicate over the connection system 120, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 310 also includes a protocol layer which implements various higher-level network protocols, such as Network File System (NFS), Common Internet File System (CIFS), Hypertext Transfer Protocol (HTTP), Internet small computer system interface (iSCSI), etc. further, the multiprotocol engine 310 includes a cluster fabric (CF) interface module 340a which implements intra-cluster communication with D-blades and with other N-blades.

In addition, the storage operating system 230 includes a set of layers organized to form a storage server 365 that provides data paths for accessing information stored on the disks 150 of the node 100. The storage server 365 also forms the D-blade 170 in combination with underlying processing hardware. To that end, the storage server 365 includes a storage manager module 360 that organizes any number of volumes, such as volume-1, volume-2, . . . , volume-N, a RAID system module 380 and a storage driver system module 390. The storage manager 360 can implement a plurality of volumes as striped volume set (SVS). In addition, the storage manager 360 can compute the location of a data container content in a volume of the SVS to ensure consistency of such content served by the cluster. The RAID system 380 manages the storage and retrieval of information to and from the volumes/disks in accordance a RAID redundancy protocol, such as RAID-4, RAID-5, or RAID-DP, while the disk driver system 390 implements a disk access protocol such as SCSI protocol or FCP.

The storage server 365 also includes a CF interface module 340b to implement intra-cluster communication with N-blades and other D-blades. The CF interface modules 340a and 340b can cooperate to provide a single file system image across all D-blades 170 in the cluster. Thus, any network port of an N-blade 160 that receives a client request can access any data container within the single file system image located on any D-blade 170 of the cluster.

The CF interface module 340 implements the CF protocol to communicate file system commands among the blades of cluster. Such communication can be effected by a D-blade exposing the CF API to which an N-blade (or another D-blade) issues calls. To that end, the CF interface module 340 can be organized as a CF encoder/decoder. The CF encoder of, e.g., CF interface 340a on N-blade 160 can encapsulate a CF message as (i) a local procedure call (LPC) when communicating a file system command to a D-blade 170 residing on the same node 100 or (ii) a remote procedure call (RPC) when communicating the command to a D-blade residing on a remote node of the cluster. In either case, the CF decoder of CF interface 340b on D-blade 350 de-encapsulates the CF message and processes the file system command.

In operation of a node 100, a request from a client 110 is forwarded as a packet over the connection system 120 and onto the node 100, where it is received at the network adapter 240 (FIG. 2). A network driver of layer 312 processes the packet and, if appropriate, passes it on to a network protocol and file access layer for additional processing prior to forwarding to the storage manager 360. At that point, the storage manager 360 generates operations to load (retrieve) the requested data from the disk 150 if it is not resident in memory 220. If the information is not in memory 220, the storage manager 360 indexes into a metadata file to access an appropriate entry and retrieve a logical VBN. The storage manager 360 then passes a message structure including the logical VBN to the RAID system 380; the logical VBN is mapped to a disk identifier and disk block number (DBN) and sent to an appropriate driver (e.g., SCSI) of the disk driver system 390. The disk driver accesses the DBN from the specified disk 150 and loads the requested data block(s) in memory for processing by the node. Upon completion of the request, the node (and operating system) returns a reply to the client 110 over the connection system 120.

The data request/response "path" through the storage operating system 230 as described above can be implemented in general-purpose hardware executing the storage operating system 230 as software or firmware. Alternatively, it can be implemented at least partially in specially designed hardware. That is, in an alternate embodiment of the invention, some or all of the storage operating system 230 is implemented as logic circuitry embodied within a field programmable gate array (FPGA) or an application specific integrated circuit (ASIC), for example.

The N-blade 160 and D-blade 170 can be implemented as processing hardware configured by separately-scheduled processes of storage operating system 230; however, in an alternate embodiment, the blades may be implemented as processing hardware configured by code within a single operating system process. Communication between an N-blade and D-blade is thus illustratively effected through the use of message passing between the blades although, in the case of remote communication between an N-blade and D-blade of different nodes, such message passing occurs over the cluster switching fabric 130. A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API).

Data Striping/Striping Tables

Figure 4A:
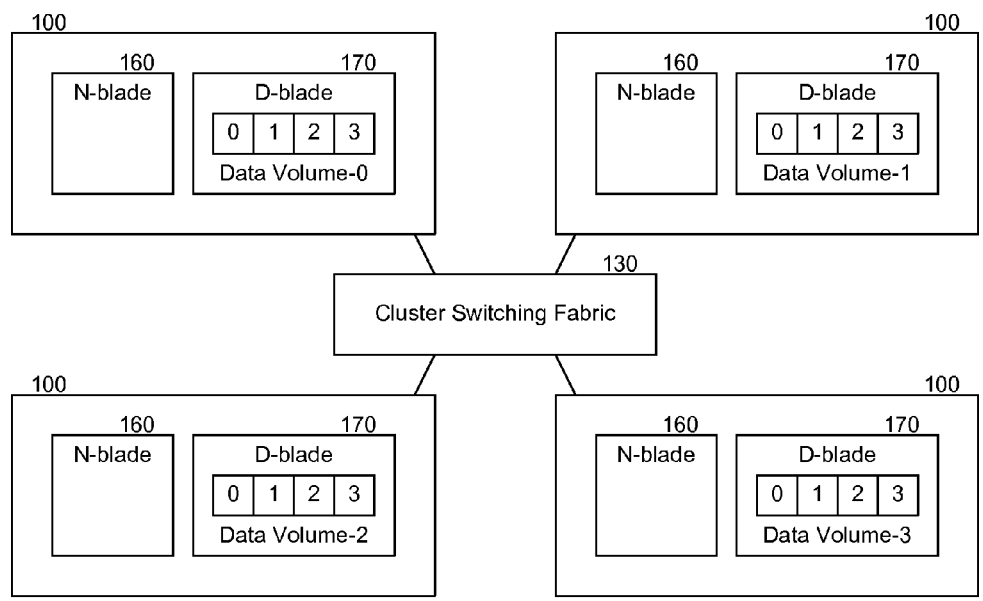
FIG. 4A is a diagram illustrating the allocation of data distributed among a plurality of volumes of a storage system architecture.

FIG. 4A illustrates an example of the striping of data across a plurality of volumes of a storage system according to a striped file system. Within a clustered computing environment, any number of volumes of varying lengths can be implemented by the embodiments described herein for striping data. Specifically, although FIG. 4A shows only one volume allocated to each node 100, any number of volumes can be allocated per node 100.

The multiple nodes 100 communicate with one another via the cluster switching fabric 130. Specifically, the N/D-blades of the nodes 100 communicate as described above. Each D-blade 170 includes a volume, such that each volume can store striped data. For example, as illustrated by FIG. 4B, data volume-0 (DV-0) can store a stripe of data at a first location, data volume-1 (DV-1) can store a stripe of data at a second location, data volume-2 (DV-2) can store a stripe of data at a third location, and data volume (DV-3) can store a stripe of data at a fourth location.

Figure 4B:
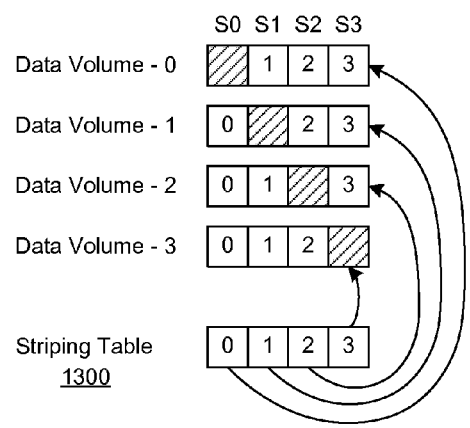
FIG. 4B is a diagram illustrating an example of a striping table, corresponding to the example of FIG. 4A.

FIG. 4B shows an example of a striping table 1300 associated with the striping example of FIG. 4A. The striping table 1300 is a data allocation structure that describes the distribution of the stripes (chunks) of data among the volumes. In the illustrated example, each logical container of data is divided into four stripes, designated S0, S1, S2 and S3 in striping table 1300. Alternatively described, each location of a stripe of data among the volumes is identified by the striping table 1300. Thus, the striping table 1300 illustrates that the first stripe S0 of a given logical container of data is located on DV-0, the second stripe S1 of the logical container of data is located on DV-0 at a third location on DV-1, the third stripe S2 of the logical container of data is located on DV-2, and the fourth stripe S3 of the logical container of data is located on DV-3 (in this example, each logical container of data has for stripes). In one embodiment, the striped data comprise a file that is striped across multiple volumes of a striped file system. Thus, a geometry, or organization, of the striped file system is illustrated by FIG. 4A.

Figure 11:
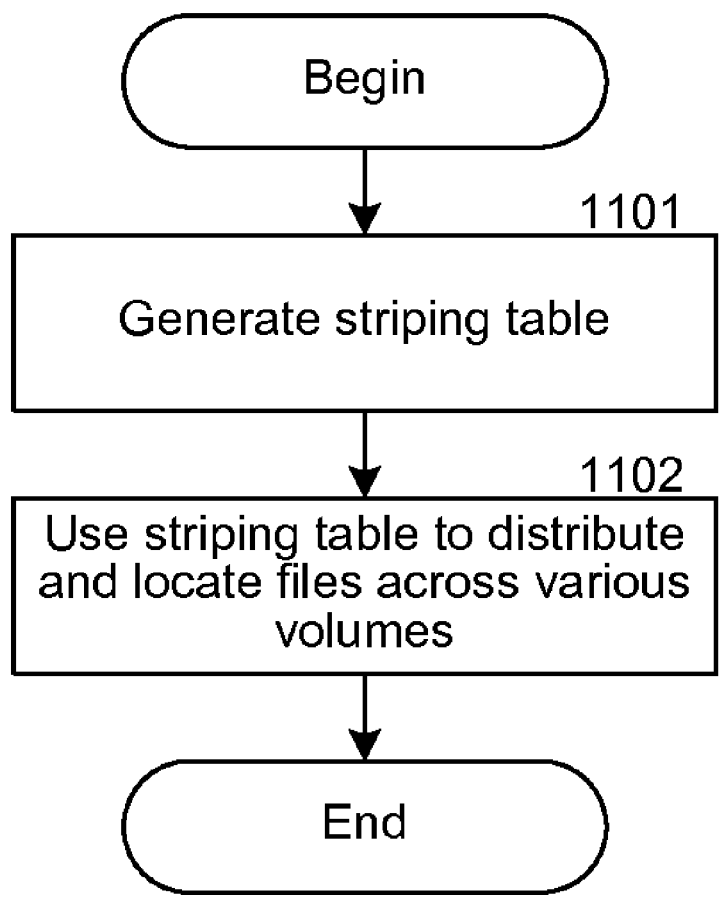
FIG. 11 is a flowchart representation of an overall process of generating and using a striping table.

FIG. 11 illustrates an overall process associated with the technique introduced here. Initially, at 1101a striping table is generated for a given storage system. The striping table may be generated by a component of the storage system in which it will be used, such as one of the nodes 100, or it may be generated by a computer system outside the storage system. Further, the striping table may be generated prior to run time, or it may be generated on an as needed basis (e.g., upon boot-up of the storage system or when a volume is added or removed from the storage system). The striping table is then used at 1102 by one or more nodes 100 in the storage system to distribute files (or other logical containers of data) across volumes and to locate requested portions of such files as needed.

There are various performance related criteria on which one can judge the strength of a particular striping pattern in a striping table, such that some layouts of striped data may be preferable to others. One problem often encountered when generating a striping table, however, is that some of these criteria are mutually antagonistic, such that designing a striping pattern that is strong in one criterion might impair its performance in another criterion. The technique introduced here can optimize a striping table for multiple such criteria, using a plurality of corresponding metrics. The plurality of the metrics can measure, for example, the evenness of storage consumption across the storage system or a designated subset thereof, the number of "hot spots" in the storage system, the degree of scatter in the storage system, and the number of changes needed to reflect a change in the geometry of the storage system.

Evenness of storage consumption relates to the goal that, in the striping table, each volume should have roughly the same number of references as all other volumes. If any volume is referenced significantly more frequently than others, then that volume is likely to become full more quickly than the other volumes.

"Hot spots" relate to the fact that sequential input/output (I/O) is a very common access pattern. In sequential I/O, a client works with one stripe, followed by the next stripe in series and so on. To achieve the best performance, such sequential I/O should utilize all the resources in the storage system rather than overworking a small subset of volumes for a period of time while the rest of the volumes stand idle. A good striping table, therefore, avoids referencing the same subset of volumes repeatedly within a portion of the striping table, preferring instead to reference all volumes consistently throughout the table.

Lack of Repetition, or "scatter", relates to the fact that sequential access while using a repetitive striping pattern can result in harmonics that adversely affect file system performance. Consider, for example, hundreds of clients working with a large striped file, each reading sequentially but those reads currently happening at essentially random starting spots throughout the file. If, for example, volume-2 becomes slow to respond for any reason—even a second of transient delay, such as might reasonably happen in any storage system—then that volume will accumulate a backlog of work to perform. As it works through that backlog, all of those clients who are now satisfied with their work against volume-2 now request data from volume-3. A flurry of requests therefore arrives at volume-3, which in turn slows down as it services all those requests. The effect is that most volumes in the storage system sit effectively idle while each volume takes turns being a bottleneck. This problem can be eliminated by ensuring that the striping table includes as little repetition as possible—or, more precisely, that the striping table includes a high degree of "scatter".

In addition, a striping table should be well suited to adapting to changes in geometry of the file system. For example, a four-volume striped file system might at some point in time become a five- or six-volume striped file system as the users' storage needs increase. When adding more volumes to a striped file system, the existing striped data will need to be redistributed to take advantage of the new storage, effectively migrating the striped files to use a new striping table that also references the new volume(s). That migration should ideally involve migrating only a small portion of the existing data onto the new storage; however, if striping tables do not take this concept into account, then migration might involve migrating almost all existing data to match the required new layout.

Note that one benefit of the technique introduced here is its flexibility: By simply inserting additional tests (metrics) for judging the strength of the striping table on new criteria, the algorithm can generate striping patterns that optimize the strength of those new criteria while only minimally impacting the strength of other existing criteria. Thus only minor, easily made revisions to the scoring process are sufficient to yield results that are custom-tailored for the task at hand.

Scatter in Striping Tables

FIG. 5A shows an example of a striping table with a round-robin striping pattern. One way to measure the repetition (or absence of scatter) in this table is to consider the transitions it encodes. From stripe S7 to stripe S8 there is a transition from volume-3 to volume-0; from stripe S8 to stripe S9 there is a transition from volume-0 to volume-1; from stripe S15 to stripe S16 there is a transition from volume-3 to volume-0 (from the end of the table back to the beginning again).

Tallying these transitions on the two-dimensional chart in FIG. 5B shows the number of transitions encountered from one volume to another. This chart shows that after volume-1 stores a stripe of data, volume-2 always stores the next stripe—never volume-0 or volume-3. A striping table with this lack of scatter implies a high degree of vulnerability to harmonics developing during sequential I/O: essentially, if volume-1 slows down, then when it finishes volume-2 is going to be inundated with requests. Far preferable would be to ensure that after volume-1 stored a stripe of data, different transitions in the table would show volumes-0, -2 or -3 storing the next stripe (preferably not volume-1 again, as that would introduce a hot spot). For example, the striping table of FIG. 6A has a much better scatter pattern, where the transitions represented in the table of FIG. 6B. This striping pattern has very little repetition; if volume 1 slowed down in servicing requests, then when it finished requests would next be spread well across volumes 0, 2 and 3.

Preparing for Expansion

Recall that a particular striping table is only suitable for use with a certain number of volumes; if the number of volumes changes, then data must be migrated to conform to a different striping table tied to the new geometry of the striped file system.

The striping tables for four- and five-volume round robin striping are shown as the top two tables in FIG. 7. Comparing the differences (Δ) between the two tables, represented in the bottom table in FIG. 7, shows the relative proportion of data that must be migrated from one volume to another if the striped file system were to change from using four volumes to using five (or vice versa), where "X" represents a change and "-" represents no change.

With the round robin algorithm, 16 of the 20 cells have changed values, representing a need to migrate 80% of a customer's data when changing the file system's storage. As the number of constituent volumes increases, this proportion increases as well, rising asymptotically towards the need to migrate almost all of the user's data for almost any change in storage.

A well-chosen striping algorithm can minimize this cost, by ensuring that successive striping tables have as few differences as possible while still supporting the appropriate number of constituent volumes. For example, FIG. 8 shows two striping tables for four and five constituent volumes. These tables differ in only four of 20 cells, as shown in the bottom table in FIG. 8, meaning that only 20% of a user's data would need to migrate for the new geometry.

In practice the technique described herein, which can generate the striping tables of FIG. 8, provides striping tables that have fewer and fewer differences as the number of volumes increase, asymptotically approaching the need to migrate only a fraction of a percent of data as the volume expands to large sizes.

Some of these goals mentioned above are mutually antagonistic: a good scatter pattern will introduce some degree of hot-spotting, and trying to avoid those hot spots might involve extra transitions with a concomitant increase in the amount of data migrated during restriping.

Addition and Removal of Volumes

Figure 9:
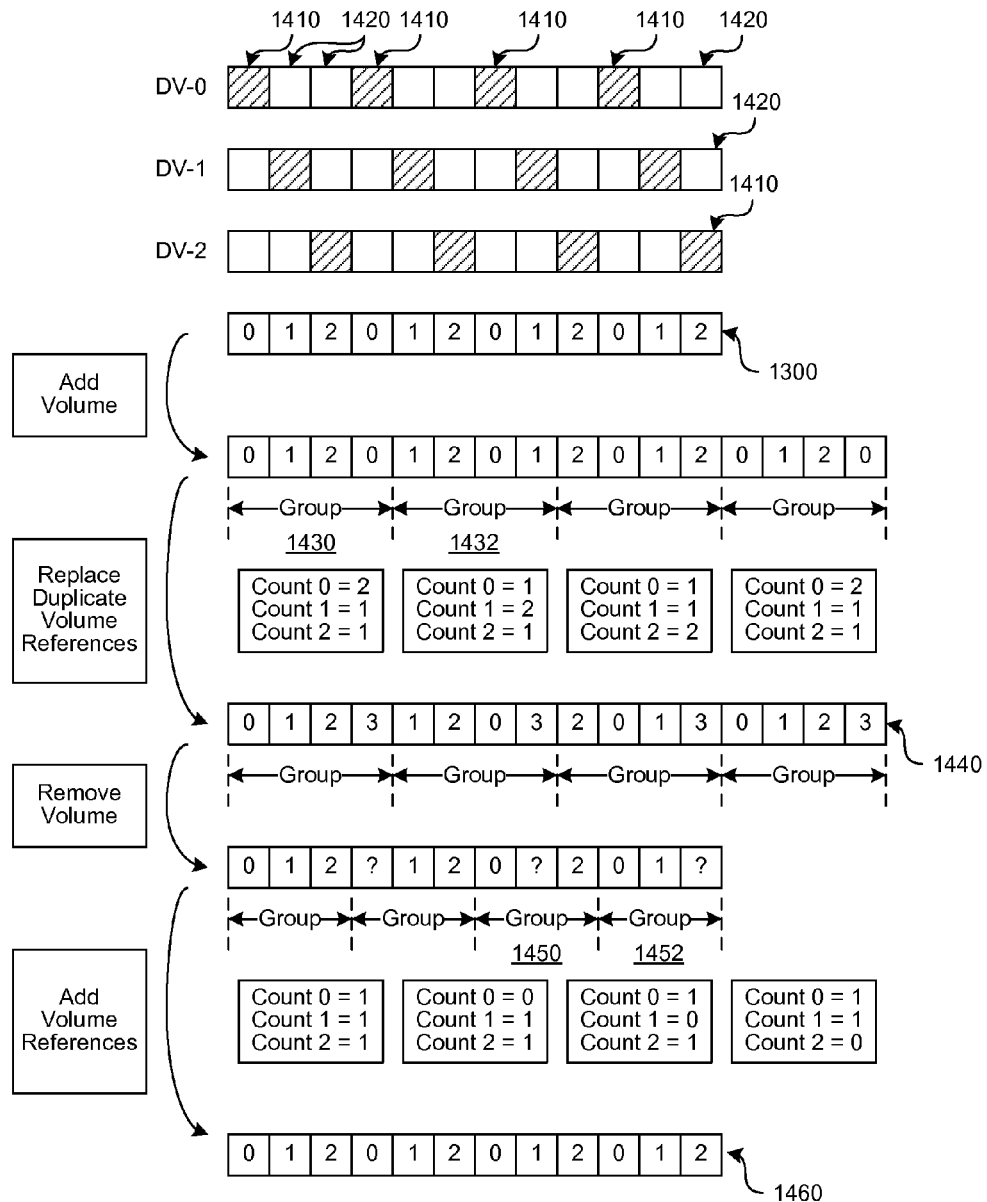
FIG. 9 is a diagram illustrating the addition and removal of volumes of a storage system architecture.

FIG. 9 illustrates an example of how the addition and removal of volumes can be handled in a striped file system through the use of devolving and devolving striping table algorithms, respectively, in accordance with certain embodiments. Volumes DV-0, DV-1, and DV-2 are three illustrative volumes distributed in a storage system architecture. Specifically, one volume is allocated to each storage server node in the illustrated embodiment. Stripes of data in a round robin data allocation technique among the three volumes are identified by striping table 1300. For example, the volume location of striped data 1410 is identified by the contents of the striping table 1300. Certain stripes 1420 of the volume may contain no data, in which case the volume is considered to be a "sparse" volume. Stripes that contain no data are not identified by the striping table 1300.

As previously described, the striping table is an allocation data structure. Although illustrated as a linear structure, the allocation structure can be implemented with any type of structure, such as a three-dimensional structure, or an n-dimensional structure, as long as the n-dimensional structure accurately identifies striped data allocated among volumes of a particular geometry (or more generally, accurately identifies responsibilities allocated among multiple resources of a particular system).

Accordingly, the striping table 1300 of FIG. 9 illustrates that the sequence of striped data of a file striped across three volumes is located on DV-0, DV-1, DV-2, DV-0, DV-1, DV-2, DV-0, DV-1, DV-2, DV-0, DV-1, and DV-2. Specifically, restriping processes are now described when adding and subsequently removing one volume, such as DV-3 (not shown). Specifically, when adding a volume to a cluster, the restriping process is an evolving algorithm, meaning that to generate a striping table for N+1 volumes, the algorithm operates on an existing striping table for N volumes. Alternatively, when removing a volume from a cluster, the restriping process is a devolving algorithm, meaning that to generate a striping table for N−1 volumes, the algorithm operates on an existing striping table for N volumes. Thus, by implementing at least one restriping process when changing the geometry, data can be well distributed while preventing hot spotting.

In the evolving algorithm illustrated by FIG. 9, the length of the striping table 1300 is increased, where locations equate to the total number of volumes added. Further, the contents of the striping table 1300 are grouped by the total number of volumes. For each group, counters are implemented, such that the counters identify the number of times a volume identifier appears in the group. Thus, in group 1430, count0 equals two because the identifier for DV-0 appears twice. The identifier for DV-1 appears once, resulting in count1 equal to one, and the identifier for DV-2 appears once, resulting in count2 equal to one. However, in group 1432, the identifier for DV-0 appears once, the identifier for DV-1 appears twice and the identifier for DV-2 appears once. Subsequently, within each group, the counter with the highest value is replaced, in the algorithm of FIG. 9, with an identifier corresponding to the newly added fourth volume, DV-3. Thus, as illustrated by striping table 1440, the duplicate reference within each group is replaced by the new identifier, "3". The evolving algorithm is implemented each time a volume is added to the cluster, which correspondingly modifies the striping table 1440.

When removing a volume from the cluster, a restriping process is also implemented for each volume removed from the cluster. Such restriping process can be a devolving algorithm. The striping table is once more grouped, where each group is the total number of volumes resulting from the volume removal. Here, the total is three, because the striping table 1440 identifies the location of striped data among four volumes. In each group that includes an identifier to the now removed fourth volume, the identifier should be replaced. The replacement identifier can be selected from the volume that is least represented within the group. For example, by keeping a count of the number of references to a volume within a group, the counter having the least number of references can be replaced. Specifically, group 1450 includes an identifier for DV-0 and DV-2 but no identifier for DV-1. Thus, the identifier "1" is inserted as a content of the striping table 1460. Correspondingly, group 1452 includes an identifier for DV-0 and DV-1 but no identifier for DV-2. Thus, the identifier "2" is inserted in the striping table 1460.

In other embodiments of the evolving and devolving algorithms illustrated in FIG. 9, the striping table 1300 need not increase or decrease in size. Particularly, the striping table 1300 can remain a constant size.

Iterative Generation of a Striping Table

Figure 10:
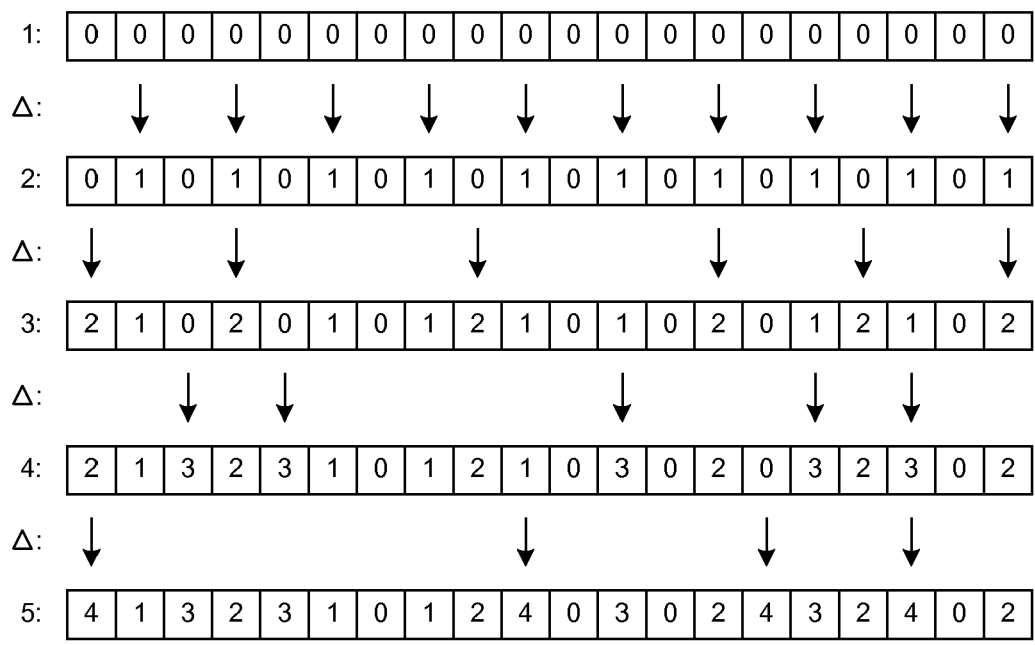
FIG. 10 illustrates a striping table being built through an iterative process.

The process of generating a striping table for a given storage system can be iterative: For example, one first builds a simple striping table for a single constituent volume (e.g., an array filled with zeroes) and remembers it as the canonical single-volume table. That table is then duplicated and an evolution algorithm is applied to it, changing some cells to include references to a second volume. The result is a striping table suitable for a file system striped across two volumes instead of just one. The process then repeats, permuting that two-volume striping table into one suitable for three volumes and so on. A typical storage system might support up to 255 constituent volumes, for example, and so would build 255 such striping tables using this process. An example of an iterative process of building a striping table is shown in FIG. 10, where the process proceeds from top to bottom, building from one constituent volume to five constituent volumes.

In certain embodiments, the number of cells modified is strictly limited in each iterative pass: No more than 1 out of every N cells may be changed, where N is the number of volumes supported by the to-be-built table. This restriction provides two benefits. First, by inserting references to the new volume at most this number of times, the algorithm ensures that the new volume is referenced no more times than is appropriate: When building a four-volume table, the fourth volume will be referenced in exactly one quarter of the cells of the striping table. Second, by limiting the changes from the previous table by a continuously decreasing amount, the migration cost between any two tables is guaranteed to decrease as the number of volumes increases.

The difficult part of the process is not so much to limit the number of cell replacements in this fashion, but rather to choose the best cells to replace.

Selection of Cells to Replace

In one embodiment, the iterative process begins by dividing the to-be-permuted striping table into regions, where the size of each region corresponds to the number of volumes that should be represented in the resulting table. Within each region the algorithm eventually makes exactly one change, replacing an existing volume reference with a reference to the as-yet-unrepresented new constituent volume. Before doing so, however, the algorithm tests a number of potential cell replacements.

This process effectively replaces each cell within the region in turn, then studies the resulting table to determine its relative strength in each of several metrics (as described above). A poorly chosen replacement might lower the overall table's strength on several metrics, while a stronger replacement might lower only a few metrics slightly while significantly boosting others. As the process iteratively attempts each replacement, it remembers which replacement generated the best overall score for the striping table. When the process has finished scoring replacements of each cell in the region, it chooses the best-scoring replacement and makes that change permanent, discarding the others. This process then repeats for the remaining regions in the striping table, each time scoring all possible replacements before ultimately selecting the best.

The algorithm used to evaluate a striping table depends on the criteria considered to be important. In one embodiment, the four criteria discussed above are used, and each criterion is granted a relative priority. The table is mathematically scored on each criterion, with higher scores representing a better distribution. The score for each criterion is multiplied by its relative priority value (for example, more-important criteria might have a multiplier of 1.1× or 2×, while less-important criteria might have a multiplier of 0.9× or 0.8×), and then the resulting scores for all criteria are summed. The result is the overall score for the striping table, used to decide which replacement is best within a region.

Some examples for mathematically judging criteria will now be discussed. First, evaluating evenness of consumption can be judged by counting the number of references to each volume throughout the table. These counts can be individually compared with a logical ideal number of references (calculated as X cells in the table, divided by N constituent volumes). The scoring system then tallies the absolute value of the difference between this ideal average and the actual number of references to each volume in turn, and returns a value of zero minus this result (such that a high value—zero being the maximum possible—is good, while a large negative value represents a significant amount of under- and over-utilized storage).

Hotspots can be judged by iteratively looking at each cell and comparing it with its neighbors out to some maximum distance (for example, 8 cells away). It is not necessary to only look at cells within the current region being examined. The number of times a particular cell's value is repeated in this close proximity is subtracted from the table's overall score, perhaps multiplying the penalty for a repetition by some factor that decreases its importance as the distance from the original cell increases.

Scatter can be judged as described above, e.g., by counting the transitions from each volume to each other volume, and comparing those counts against an ideal value. Any deviation from the ideal is subtracted from the table's score, such that tables with poor scatter characteristics will score badly overall and will be selected against.

Suitability for changes in geometry actually does not need be scored, as it is implicitly enforced to be most effective by the iterative striping table evolution process described above.

Note that, in practice, it is typically unnecessary to perform a full evaluation of the entire striping table after each theoretical replacement. Doing so is benign but relatively CPU-intensive. In practice, one can recall the score of the unmodified striping table, then consider only the impact of replacing a particular cell as a relative change from that original score. Such an evaluation is much faster to perform.

Having completed a single processing pass across the striping table and made an appropriate number of replacements, a second stage of refinement can then be performed, as described below.

Figure 12:
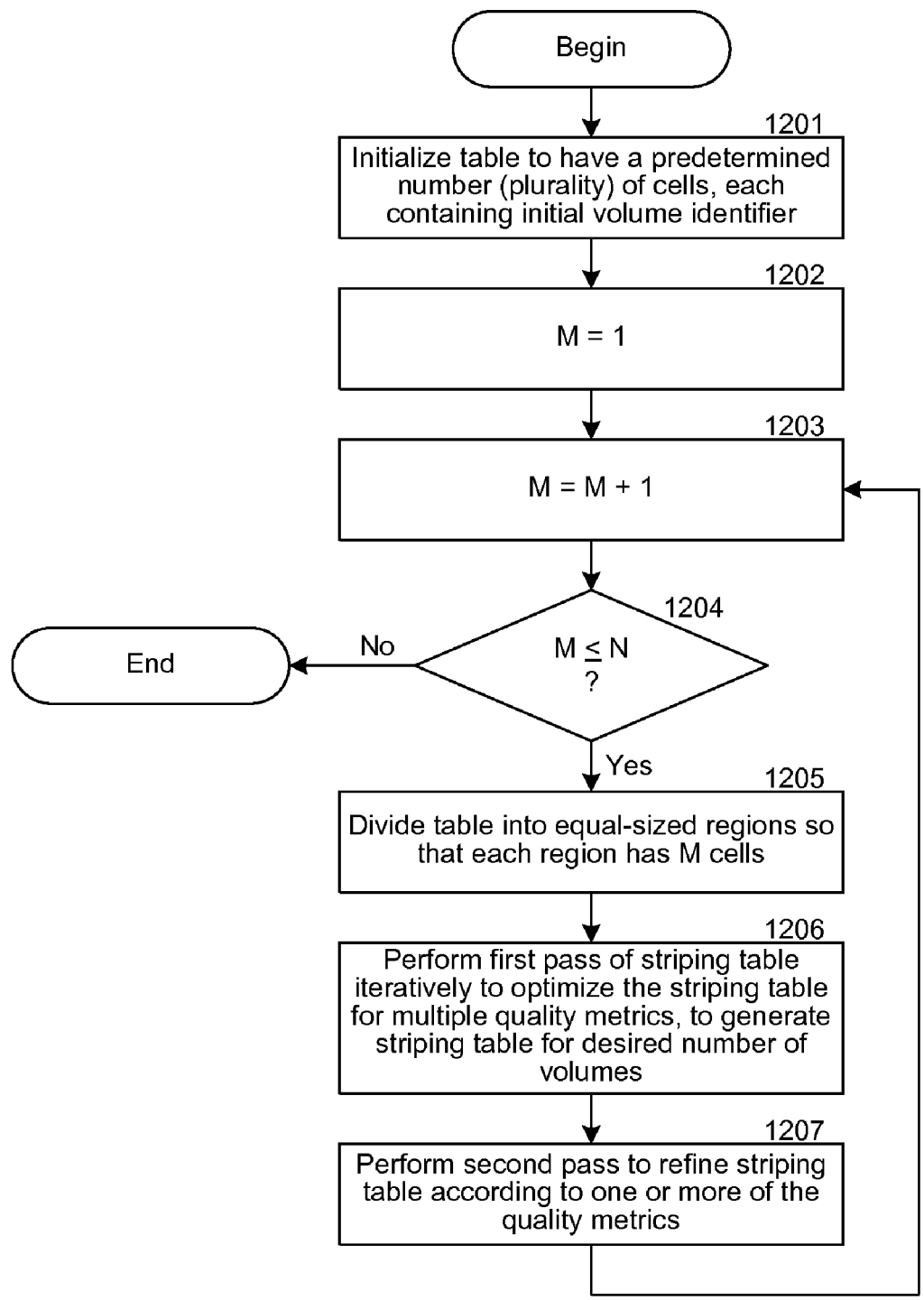
FIG. 12 is a flowchart representation of an iterative process of generating a striping table, according to one embodiment.

FIG. 12 is a high-level flowchart representation of the iterative process of generating the striping table, according to one embodiment. As indicated above, the process may be performed by an element in the storage system in which the striping table will be used, or by a separate computer system.

Initially, at 1201 the process initializes the striping table to have a predetermined number of cells, containing identifiers of an initial constituent volume, e.g. identifier "0" representing volume-0. A variable M, the purpose of which is explained below, is then initialized to have a value of one at 1202, and then incremented by one at 1203. The following operations are then performed while M is less than or equal to N (1204), where N is the number of volumes in the storage system that the striping table is intended ultimately to represent.

First, at 1205 the process divides the table into a number of equal sized regions so that each region contains M cells, where M equals the number of volumes that are to be represented in the striping table in the current iteration. For example, initially, at 1205 each region will have two cells (M=2), in the next iteration each region will have three cells (M=3), and so forth. In one embodiment, if the table currently is not evenly divisible into equal-sized regions of M cells each, then before the dividing is done at 1205, the last group is omitted if it has fewer than N/2 cells, or is treated as a full group and granted a replacement if it has at least N/2 cells.

At 1206 the process performs a first stage ("first pass") of the striping table iteratively to optimize the striping table for multiple quality metrics (such as those discussed above), to generate a striping table for the desired number of volumes in the storage system. At 1207, optionally, the system performs a second stage ("second pass") to refine the striping table according to one or more of the quality metrics.

Figure 13:
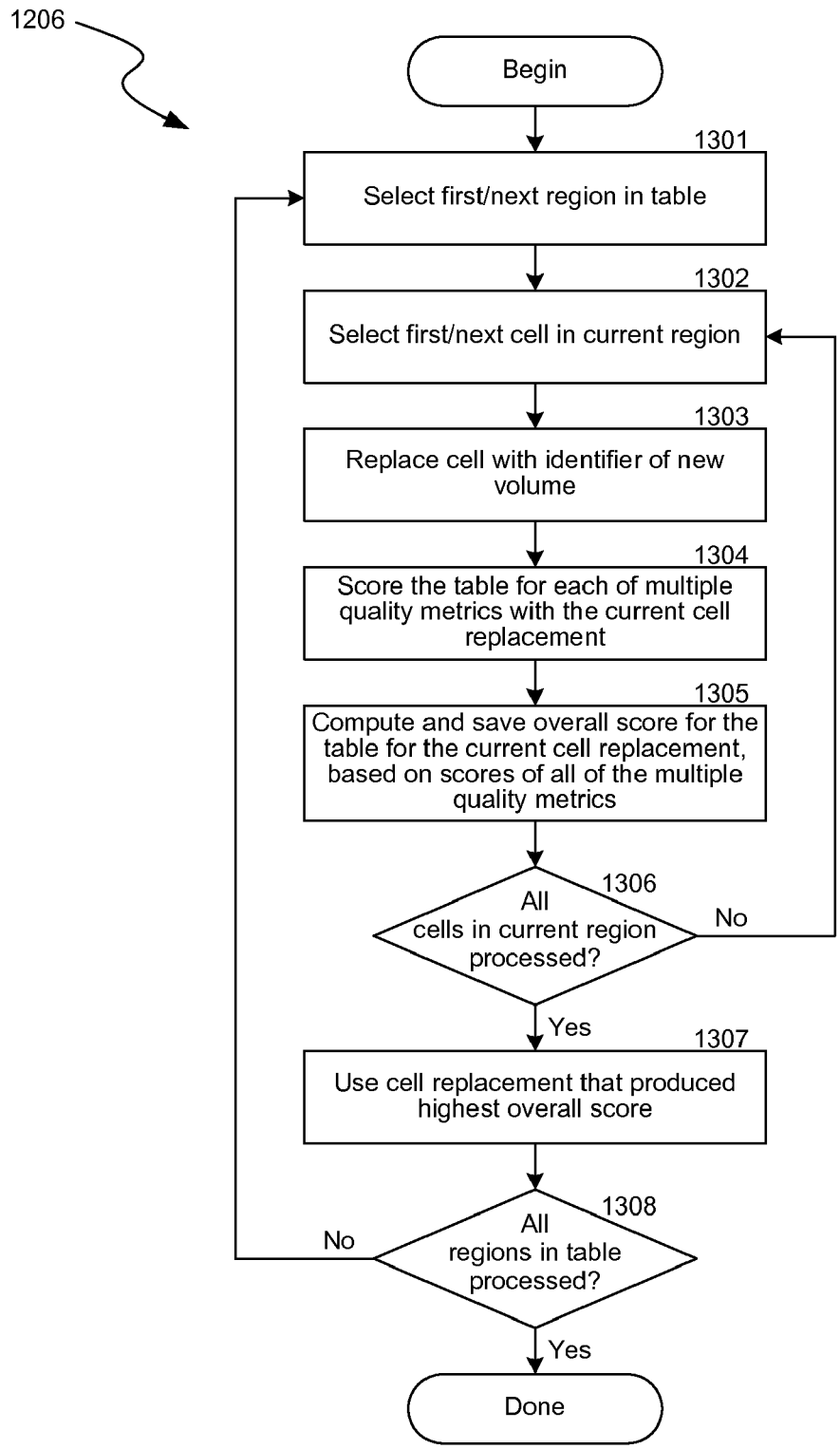
FIG. 13 is a flowchart representation of the first stage of the iterative process of FIG. 12, according to one embodiment.

The first stage of the iterative process, according to one embodiment, will now be described in greater detail with reference to FIG. 13. Initially, at 1301 the process selects the next (initially, the first) region in the table as the current region to be examined. At 1302 the process then selects the next (initially, the first) cell in the current region as the current cell to be processed. The process then replaces the current cell with the identifier of the new volume (the volume as-yet-to-be-represented in the table) at 1303. Next, at 1304 the process scores the table for each of multiple quality metrics, such as those discussed above, with the current cell replacement. After doing so, at 1305 the process computes and saves the overall score for the table, for the current cell replacement, which may be done as described above, i.e., based on the combined scores of the various different quality metrics (e.g., using a weighting/prioritization).

After all cells in the current region have been processed in this way (1306, 1302), at 1307 the process then takes the cell replacement produced the highest overall score and adopts it as the "final" replacement (subject to modification in a subsequent refinement stage). Then, after all regions in the table have been processed in this manner (1308, 1301), the first stage 1206 ends.

Having completed the first stage in which an appropriate number of replacements were made as described above, the second stage of refinement can then optionally be performed. This second stage is intended to further strengthen certain metrics. For example, in certain embodiments, even allocation across all constituent volumes is particularly important. During the first stage, that metric might be allowed to temporarily increase or decrease in score in order not to restrict unnecessarily the manipulation of other metrics (one replacement might temporarily reduce this score, while a second replacement would restore it, but ultimately this metric is desired to be as strong as possible.

Therefore, this second stage begins by counting the number of references to each constituent volume; if the most-referenced volume has significantly more references than the least-referenced volume (in practice, "significantly more" might be as few as one or two additional references), then one earlier-chosen first-stage replacement is carefully selected and undone, and a different cell is instead carefully selected and replaced. The replacement that is reverted is chosen from among those that destroyed a reference to the now-under-represented volume, and the new replacement is chosen from among those cells that currently refer to a now-over-represented volume. In each case, the actual choice of replacements to revert and to apply can be made by scoring each candidate replacement against its other candidates, to select the one that best optimizes the table for all of the criteria. This second-stage process then repeats until there is no longer any significant deviation in usage among volumes.

At the end of the second stage, the resulting striping table is considered complete and the iterative evolution process uses it as a foundation for developing the next striping table in series.

The techniques introduced above can be implemented by programmable circuitry configured by software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware usable to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   generating, in a computer system, a data structure for use in determining how responsibilities for services in a network storage system should be distributed amongst a plurality of resources in the network storage system, wherein the data structure includes a number of regions, each region including a plurality of cells, wherein generating the data structure includes executing an iterative process of optimizing the data structure for a plurality of quality metrics, and wherein the iterative process includes:
   successively adding regions to the data structure, each added region including a plurality of cells; and
   after each instance of adding a region to the data structure, then for each region of the plurality of regions in the data structure,
   for each cell in the region, temporarily replacing only said cell and then scoring the data structure for a plurality of quality criteria;
   comparing results of said scoring for a plurality of instances of temporarily replacing a cell; and
   selecting a cell to be replaced in the region, based on a result of said comparing; and
   using the data structure, by a storage controller in the network storage system, to distribute the responsibilities for the services amongst the plurality of resources.

2. A method as recited in claim 1, wherein each said cell includes an identifier of a resource, and wherein said replacing comprises replacing a cell with an indication of a new resource.

3. A method as recited in claim 1, wherein said iterative process comprises repeating said temporarily replacing, said scoring and said selecting, while the number of regions in the data structure is less than or equal to the number of resources in said plurality of resources.

4. A method as recited in claim 1, wherein each of the plurality of resources is a data volume in the network storage system, each cell corresponds to a different stripe of a logical container of data that is striped or to be striped across a plurality of data volumes, and each cell includes an indication of a data volume in which the stripe is stored or to be stored.

5. A method as recited in claim 1, wherein each of the plurality of resources is a physical storage device member of a RAID group in the network storage system, each cell corresponds to a different segment of parity data for a logical container of data, and each cell includes an indication of a physical storage device in which the corresponding segment of parity data is stored or to be stored.

6. A method as recited in claim 1, wherein said method comprises replacing a cell in each of the regions based on results of said comparing.

7. A method as recited in claim 1, wherein the plurality of quality criteria comprise:
a number of occurrences of volume identifiers in the table, per volume;
a number occurrences of hot spots in the table; and
a degree of repetition of volume identifiers in the table.

8. A method comprising:
generating, in a computer system, a striping table for use in distributing a plurality of subsets of a logical container of data across a plurality of volumes in a striped manner in a network storage system, wherein generating the striping table includes
forming the striping table from a number (M) of regions, wherein said number (M) is less than or equal to the number (N) of volumes in said plurality of volumes, each said region including a plurality of contiguous cells, each said cell corresponding to a different stripe of the logical container of data and including an identifier of a volume in which the stripe is located or to be located;
testing potential cell replacements for the plurality of regions by iterating, while M is less than or equal to N, the set of operations including:
for each region of the plurality of regions, and
for each cell in the region successively,
executing a temporary cell replacement by temporarily replacing the cell with an identifier of a new volume,
computing a quality metric for the table for each of a plurality of criteria, based on the temporary cell replacement;
determining an overall score for the region for said temporary cell replacement, based on the quality metrics for the plurality of criteria;
selecting one of the executed temporary cell replacements for the region as a final cell replacement for the region, based on the overall scores of the executed temporary cell replacements for the region; and
if M is less than N, incrementing M by one; and
using the striping table, by a storage controller in the network storage system, to distribute the plurality of subsets of the logical container of data set across the plurality of volumes.

9. A method as recited in claim 8, wherein the plurality of criteria comprise:
a number of occurrences of volume identifiers in the table, per volume;
a number occurrences of hot spots in the table; and
a degree of repetition of volume identifiers in the table.

10. A method as recited in claim 8, wherein said selecting one of the executed temporary cell replacements for the region as a final cell replacement for the region comprises making a change to exactly one cell in the region.

11. A network storage controller comprising:
a network adapter through which to communicate with a storage client over a network;
a storage adapter through which to communicate with a non-volatile mass storage facility; and
a processor coupled to the network adapter and the storage adapter and configured to execute a set of operations, including
generating a data structure for use in determining how responsibilities for services in a network storage system should be distributed amongst a plurality of resources in the network storage system; and
using the data structure to distribute responsibilities for services amongst the plurality of resources;
wherein the data structure includes a number of regions, each region including a plurality of cells, wherein generating the data structure includes an iterative process which includes
successively adding regions to the data structure, each added region including a plurality of cells; and
after each instance of adding a region to the data structure, then for each region of the plurality of regions in the data structure,
for each cell in the region, temporarily replacing only said cell and then scoring the data structure for a plurality of quality criteria; and
selecting a cell to be replaced in each of the regions, based on results of said scoring.

12. A network storage controller as recited in claim 11, wherein each said cell includes an identifier of a resource, and wherein said successively replacing cells comprises successively replacing each of the cells with an indication of a new resource.

13. A network storage controller as recited in claim 11, wherein said iterative process comprises repeating said temporarily replacing, said scoring and said selecting, while the number of regions in the data structure is less than or equal to the number of resources in said plurality of resources.

14. A network storage controller as recited in claim 13, wherein each of the plurality of resources is a data volume in the network storage system, each cell corresponds to a different stripe of a logical container of data that is striped or to be striped across a plurality of data volumes, and each cell includes an indication of a data volume in which the stripe is stored or to be stored.

15. A network storage controller as recited in claim 13, wherein each of the plurality of resources is a physical storage device member of a RAID group in the network storage system, each cell corresponds to a different segment of parity data for a logical container of data, and each cell includes an indication of a physical storage device in which the corresponding segment of parity data is stored or to be stored.

16. A network storage controller as recited in claim 11, wherein the plurality of quality criteria comprise:
a number of occurrences of volume identifiers in the table, per volume;
a number occurrences of hot spots in the table; and
a degree of repetition of volume identifiers in the table.

17. An apparatus comprising:

an input device;

an output device; and a processor coupled to the input device and the output device and configured to perform a process which includes generating a data structure for use by a storage controller in determining how a plurality of subsets of a logical container of data should be striped across a plurality of volumes in a network storage system, wherein generating the data structure includes executing an iterative process of optimizing the data structure for a plurality of quality metrics, and wherein the iterative process includes:

successively adding regions to the data structure, each added region including a plurality of cells; and after each instance of adding a region to the data structure, then for each region of the plurality of regions in the data structure, for each cell in the region, temporarily replacing only said cell and scoring the data structure for a plurality of quality criteria;

comparing results of said scoring for a plurality of instances of temporarily replacing a cell; and selecting a cell to be replaced in the region, based on a result of said comparing.

18. An apparatus as recited in claim 17, wherein each cell corresponds to a different stripe of the logical container of data and includes an indication of a volume in which the stripe is located or to be located.

19. An apparatus as recited in claim 18, wherein said successively replacing cells comprises successively replacing the cells with an indication of a new volume.

20. An apparatus as recited in claim 18, wherein each cell includes an identifier of a volume in which the stripe is located or to be located.

21. An apparatus as recited in claim 17, wherein an iteration of said iterative process further comprises:

after completion of replacing a selected cell in each of the regions, increasing the number of regions in the data structure by one;

and wherein said iterative process comprises repeating the iteration with the number of regions in the table so increased, while the number of regions in the data structure is less than or equal to the number of volumes in said plurality of volumes.

22. An apparatus as recited in claim 17, wherein the plurality of quality criteria comprise:

a number of occurrences of volume identifiers in the table, per volume;

a number occurrences of hot spots in the table; and a degree of repetition of volume identifiers in the table.

* * * * *